(12) United States Patent
Sethi et al.

(10) Patent No.: US 12,212,459 B2
(45) Date of Patent: Jan. 28, 2025

(54) METHOD TO RECOMMEND FAILOVER AND RELIABLE CONNECTION FOR REMOTE MANAGEMENT OF DEVICES

(71) Applicant: Dell Products L.P., Round Rock, TX (US)

(72) Inventors: Parminder Singh Sethi, Ludhiana (IN); Lakshmi Saroja Nalam, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/181,779

(22) Filed: Mar. 10, 2023

(65) Prior Publication Data

US 2024/0305525 A1    Sep. 12, 2024

(51) Int. Cl.
*H04L 41/0816* (2022.01)
*H04L 41/0823* (2022.01)

(52) U.S. Cl.
CPC ...... *H04L 41/0816* (2013.01); *H04L 41/0836* (2013.01)

(58) Field of Classification Search
CPC ............ H04L 41/0816; H04L 41/0836
See application file for complete search history.

(56) References Cited

U.S. PATENT DOCUMENTS

| | | | |
|---|---|---|---|
| 6,229,538 B1 * | 5/2001 | McIntyre | ............... H04L 41/22 709/224 |
| 6,671,802 B1 | 12/2003 | Ott | |
| 6,757,838 B1 | 6/2004 | Chaiken | |
| 7,590,981 B2 | 9/2009 | Gupta et al. | |
| 8,078,448 B1 | 12/2011 | Wohlberg et al. | |
| 8,090,819 B1 * | 1/2012 | Ramamurthy | ........ H04L 41/344 709/224 |
| 9,086,941 B1 | 7/2015 | Siegel | |
| 9,444,717 B1 | 9/2016 | Aithal | |
| 11,128,701 B1 | 9/2021 | Virtuoso | |
| 2006/0026415 A1 | 2/2006 | Chen | |
| 2006/0029097 A1 * | 2/2006 | McGee | ................... H04L 47/20 370/468 |
| 2008/0148031 A1 | 6/2008 | Brown | |
| 2008/0215910 A1 * | 9/2008 | Gabriel | ................... H04L 45/48 714/E11.071 |
| 2009/0103430 A1 * | 4/2009 | Wang | ................... H04L 12/5692 370/221 |
| 2011/0035498 A1 * | 2/2011 | Shah | ....................... H04L 43/10 709/226 |
| 2011/0113224 A1 | 5/2011 | Isshiki et al. | |
| 2011/0225274 A1 | 9/2011 | Dvorkin | |

(Continued)

*Primary Examiner* — Patrice L Winder
(74) *Attorney, Agent, or Firm* — Chamberlain, Hrdlicka, White, Williams & Aughtry; Aly Dossa (57) ABSTRACT

Embodiments described herein relate to a method for recommending changes to a system that includes a remote access controller (RAC) which has at least two network interfaces (NI). An orchestrator reconfigures the remote access controller and/or it network interfaces when telemetry is retrieved from the system and the telemetry indicates that the remote access controller loses its connections with a connected network at a greater frequency than a threshold. The orchestrator determines recommend changes, notifies a user, and when able reconfigures the remote access controller to at least use the at least two network interfaces in a failover configuration.

12 Claims, 6 Drawing Sheets

(56) References Cited

U.S. PATENT DOCUMENTS

| | | |
|---|---|---|
| 2015/0081829 A1 | 3/2015 | Maity |
| 2015/0169291 A1 | 6/2015 | Dube |
| 2015/0278219 A1 | 10/2015 | Phipps |
| 2016/0011880 A1 | 1/2016 | Maity |
| 2016/0162280 A1 | 6/2016 | Murayama et al. |
| 2017/0155573 A1 | 6/2017 | Khemani |
| 2018/0113728 A1 | 4/2018 | Musani et al. |
| 2018/0152341 A1 | 5/2018 | Maeda et al. |
| 2018/0232458 A1 | 8/2018 | Fitzgerald |
| 2018/0267832 A1 | 9/2018 | Biener |
| 2019/0318039 A1 | 10/2019 | Nozhchev |
| 2019/0391798 A1 | 12/2019 | Farrell |
| 2020/0007629 A1* | 1/2020 | Tse .................. H04L 43/10 |
| 2020/0076717 A1* | 3/2020 | Rantzau .............. H04L 43/0829 |
| 2020/0104113 A1 | 4/2020 | Grill et al. |
| 2020/0156243 A1 | 5/2020 | Ghare et al. |
| 2020/0403985 A1* | 12/2020 | Mahadevan .......... H04L 41/084 |
| 2021/0089325 A1 | 3/2021 | Suryanarayana |
| 2022/0019561 A1 | 1/2022 | Jose |
| 2022/0036224 A1 | 2/2022 | Sethi |
| 2022/0383324 A1 | 12/2022 | Sheshadri |
| 2023/0029888 A1 | 2/2023 | Wang |
| 2023/0117047 A1 | 4/2023 | Francis |
| 2023/0236844 A1 | 7/2023 | Sethu |
| 2023/0239195 A1* | 7/2023 | Mirgorodskiy ......... H04L 43/10 709/223 |
| 2023/0350717 A1 | 11/2023 | Neate |
| 2024/0032081 A1 | 1/2024 | Sun |
| 2024/0070050 A1 | 2/2024 | Pahwa |
| 2024/0184682 A1 | 6/2024 | Vudathu |

\* cited by examiner

METHOD TO RECOMMEND FAILOVER AND RELIABLE CONNECTION FOR REMOTE MANAGEMENT OF DEVICES

BACKGROUND

In an enterprise environment, a system might be running multiple applications that are either working together or dependent on each other. The system may take the form of a datacenter and comprise of many hardware elements/devices such as processors, storage devices, network devices, and other devices/elements. Once the elements/devices are deployed, inevitable problems occur with the elements/devices requiring correction.

SUMMARY

In general, certain embodiments described herein relate to a method for recommending changes to a system that comprises at least one remote access controller (RAC) that comprises at least two network interfaces (NI). Telemetry is retrieved from the system and used to detect the frequency that the at least one remote access controller loses its connection with a connected network. When this frequency is determined to be greater than a threshold, the current configuration of the at least one remote access controller is determined. Based on this configuration, one or more changes to the at least one remote access controller is recommended. The recommended changes are then implemented, and the one or more changes at least comprises of modifying how the at least one remote access controller uses the at least two network interfaces.

In general, certain embodiments described herein relate to a non-transitory computer readable medium comprising computer readable program code which, when executed by a computer processor, enables the computer processor to perform a method for recommending changes to a system that comprises of at least one remote access controller which comprises of at least two network interfaces. Telemetry is retrieved from the system and used to detect the frequency that the at least one remote access controller loses its connection with a connected network. When this frequency is determined to be greater than a threshold, the current configuration of the at least one remote access controller is determined. Based on this configuration, one or more changes to the at least one remote access controller is recommended. The recommended changes are then implemented, and the one or more changes at least comprises of modifying how the at least one remote access controller uses the at least two network interfaces.

In general, certain embodiments described herein relate to a system comprising: a remote access controller that comprises of at least two network interfaces, cables that connect the remote access controller to the network, and a bare metal orchestrator. The bare metal orchestrator comprises of at least one processor and at least one memory. The at least one memory includes instructions which, when executed by the processor, perform a method for recommending changes to the system. Telemetry is retrieved from the system and used to detect the frequency that the remote access controller loses its connection with a connected network. When this frequency is determined to be greater than a threshold, the current configuration of the remote access controller is determined. Based on this configuration, one or more changes to the remote access controller is recommended. The recommended changes are then implemented, and the one or more changes at least comprise of modifying how the remote access controller uses the at least two network interfaces.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

In general, embodiments of the invention relate to a system that includes one or more information handling systems (IHS) which may take the form of a server or other computational devices that are part of a data center, edge, cloud, or other commercial or enterprise/academic/scientific computational system. In one or more embodiments of the invention, the one or more information handling systems include a remote access controller (RAC) that allows for managing an IHS's hardware remotely. This RAC, in one or more embodiments of the invention, may configure the associated hardware elements as well as other components (software and firmware) even when the IHS is turned off.

The RAC may be configured in several modes, including a dedicated mode and a shared mode. For critical hardware, generally, the RAC is placed in the dedicated mode. This is because it is the best practice, as it allows out of band management to be completely segmented. In this mode, connectivity is not interrupted when a system reboots or hangs. However, in the dedicated mode there is no failover, which makes it a single point of failure.

In one or more embodiments of the invention, the RAC is improved with the addition of a new network interface (NI) along with the required teaming libraries. In addition, a recommendation engine (e.g., a bare metal orchestrator), makes recommendations for configuring the necessary cabling, as well as other settings. This includes having the administrators perform the correct cabling, as well as set the RAC NI teaming to the proper setting. By having NI teaming, the one or more embodiments of the invention allow for failover for the RAC improving its ability to operate and allow administrators and/or manufactures provide remote management to the IHS even when the system is offline and/or when problems are occurring with the first NI.

The following describes various embodiments of the invention.

Figure 1A:
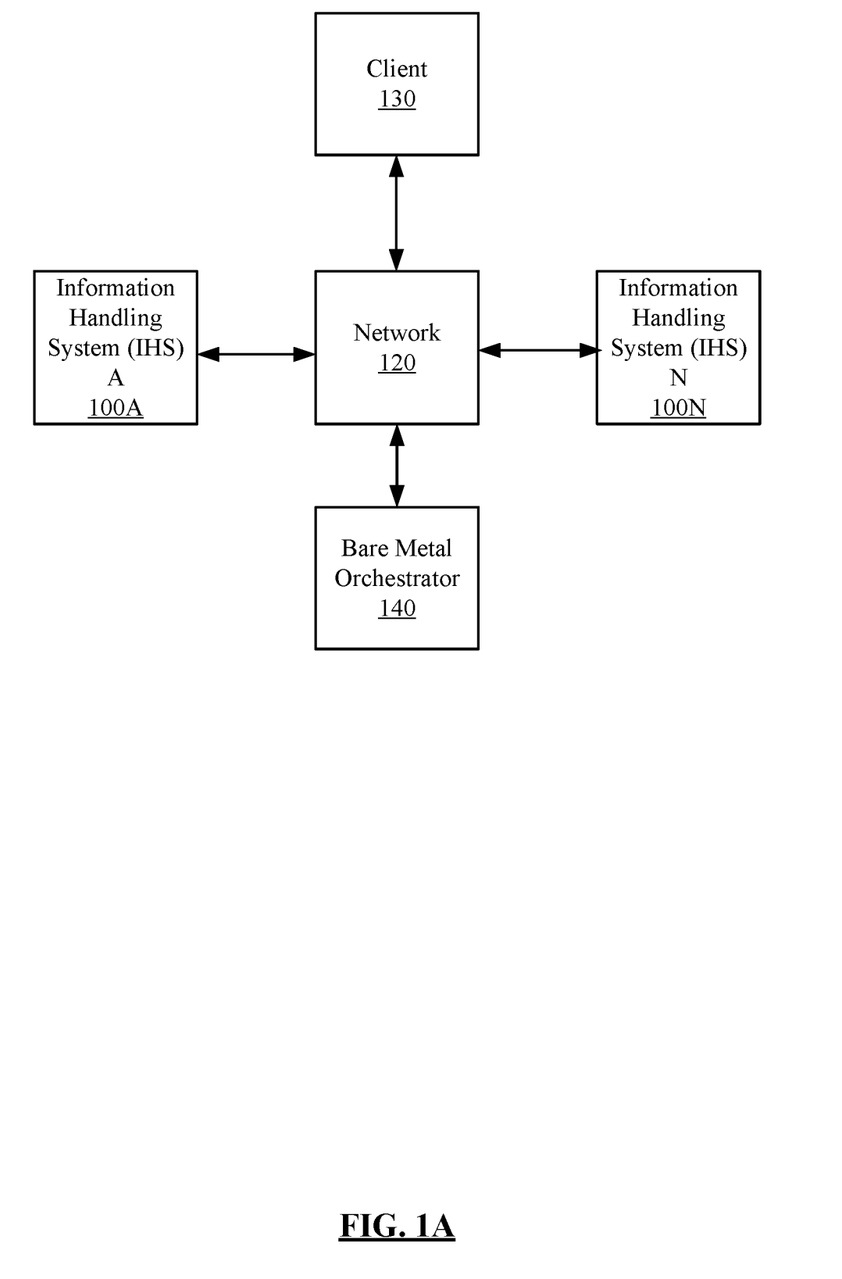
FIG. 1A shows a diagram of a system in accordance with one or more embodiments of the invention.

FIG. 1A shows a diagram of a system that performs the claimed methods in one or more embodiments of the invention. The system includes a plurality of computational devices such as, but not limited to information handling systems (IHSs) (e.g., 100A-100N), a bare metal orchestrator (140), and one or more client computers (e.g., 130). Each of the computational devices are connected to a network (120) such as, but not limited to: the Internet or local/private networks. Each component will be described below in more detail, and the specific number and type of computational systems shown in FIG. 1A are only representative and a subset of the system.

In one or more embodiments of the invention, the information handling systems (IHSs) (e.g., 100A-100N) perform workloads and provide services to one or more clients (e.g., 130) and/or other entities (not shown) in the system illustrated in FIG. 1A. In one or more embodiments of the invention, the IHSs may take the form of production hosts, servers, and other similar computational devices. The IHSs may be a part of or may form a data center, or node of a datacenter or other large grouping of computational devices including edge and cloud systems.

The IHSs (e.g., 100A-100N) include a plurality of devices (e.g., 100A-100N) such as, but not limited to, data centers, personal computers (PCs), laptops, and any other computation device that may have its hardware upgraded and/or replaced. For simplicity, the system shown in FIG. 1A only shows two devices (100A, 100N), however, they are only representative and a subset of the system. The system may include any number of datacenters that are geographically dispersed (for example, in a non-limiting example, one or more located on each continent). Further, in one or more embodiments of the invention, one or more IHSs (e.g., 100A-100N) may be located at the same facility and/or one or more IHSs (e.g., 100A-100N) located remotely in other locations that are geographically dispersed. The IHS (e.g., 100A) will be described in more detail with regards to FIGS. 1B and 1C.

The IHSs (e.g., 100A-100N) may further comprise of the functionality to perform computer implemented services for users (e.g., clients 130). The computer implemented services may comprise, for example, database services, electronic mail services, data processing services, web services, etc. The IHSs (e.g., 100A-100N) may also include means to store data and/or provide the data to client (130) and other entities.

Figure 4:
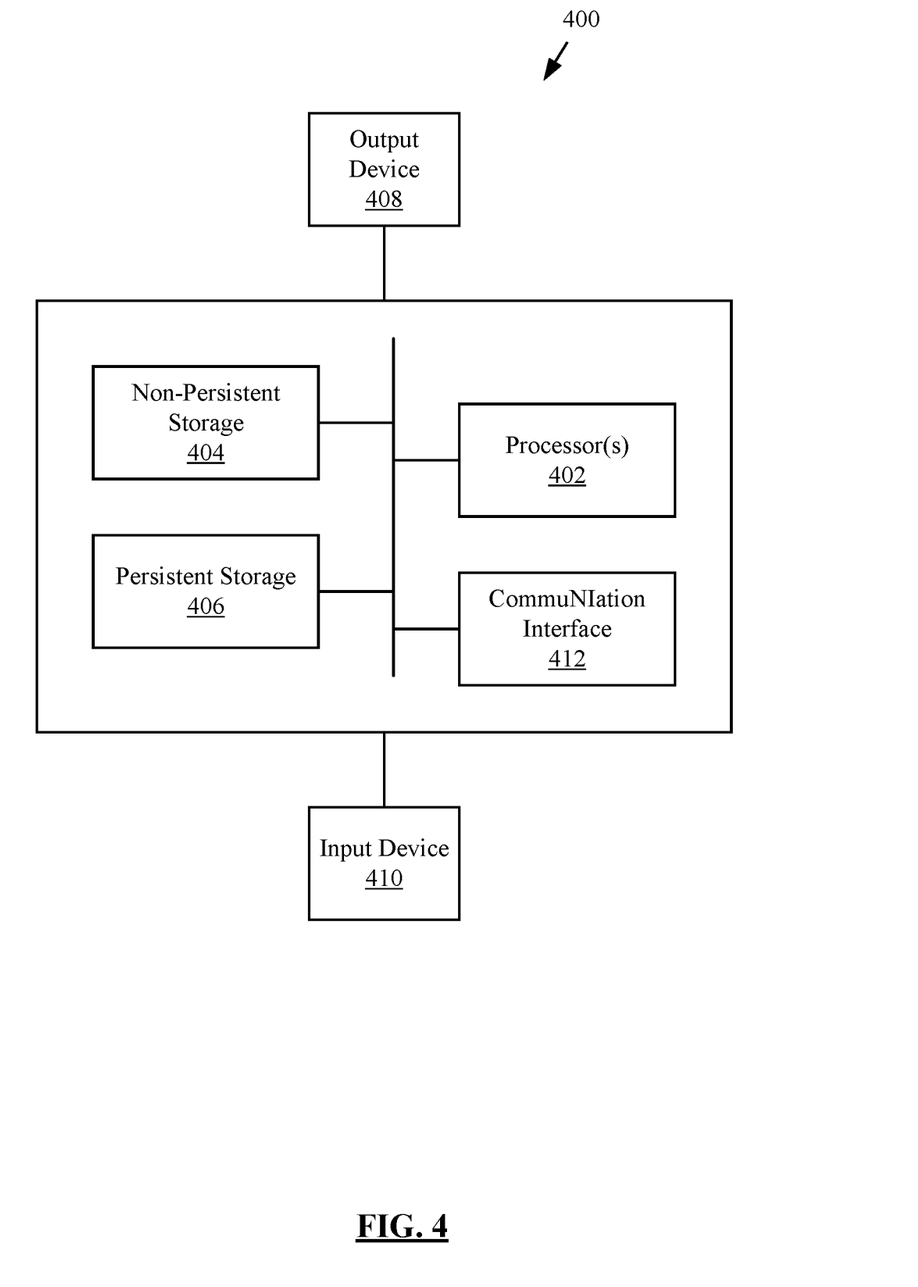
FIG. 4 shows a diagram of a computing device in accordance with one or more embodiments of the invention.

In one or more embodiments of the invention, the IHSs (e.g., 100A-100N) are implemented as computing devices (see e.g., FIG. 4). A computing device may be, for example, a mobile phone, tablet computer, laptop computer, desktop computer, server, distributed computing system, or cloud resource. The computing device include one or more processors, memory (e.g., random access memory), and persistent storage (e.g., disk drives, solid state drives, etc.). The computing device include instructions that are stored on the persistent storage. These instructions, when executed by the processor(s) of the computing device, cause the computing device to perform the functionality of the IHSs (e.g., 100A-100N) described throughout this application.

In one or more embodiments of the invention, the IHSs (e.g., 100A-100N) are implemented as logical devices. The logical devices may utilize the computing resources of any number of computing devices, and thereby provide the functionality of the IHSs (e.g., 100A-100N) described throughout this application.

In one or more embodiments of the invention, the IHSs (e.g., 100A-100N) interact via a network (120) with a bare metal orchestrator (140), one or more clients (e.g., 130), and other IHSs (e.g., 100A-100N). The network (120) may take any form, including any combination of wireless and/or wired networks. The network (120) may be a local network (LAN), or a wide area network (WLAN), including the Internet or a private enterprise network that connects more than one location. The network (120) may be any combination of the above networks, other known network, or any combination of network types.

In one or more embodiments of the invention, the network (120) allows the IHSs (e.g., 100A-100N) to communicate with each other and other external computing devices such as, but not limited to: a client (130), a bare metal orchestrator (140) and other components such as backup agents (not shown) and storage devices (not shown). The network (120) may be a high-speed internal network and/or may comprise part of an external network (e.g., 120).

In one or more embodiments of the invention, the network (120) include a plurality of different networks and network types. A network (e.g., 120) may refer to an entire network or any portion thereof (e.g., a logical portion of the devices within a topology of devices). A network (e.g., 120) include a data center network, a wide area network, a local area network, a wireless network, a cellular phone network, and/or any other suitable network that facilitates the exchange of information from one part of the network to another. A network (e.g., 120) may be located at a single physical location or be distributed at any number of physical sites. In one or more embodiments, a network (e.g., 120) may be coupled with, or overlap, at least in part, with the Internet.

In one or more embodiments, although shown separately in FIG. 1A, the network (120) include any number of devices within any components of the system, as well as devices external to, or between, such components of the system. In one or more embodiments, at least a portion of such devices are network devices (not shown). A network device is a device that comprises and/or is operatively connected to persistent storage (not shown), memory (e.g., random access memory (RAM)) (not shown). A network device may also comprise of one or more processor(s) (e.g., integrated circuits) (not shown), and at least two physical network interfaces, which may provide connections (i.e., links) to other devices (e.g., computing devices, other network devices, etc.).

In one or more embodiments, a network device also comprises of any number of additional components (not shown), such as, network chips, field programmable gate arrays (FPGAs), application specific integrated circuits (ASICs), indicator lights (not shown), fans (not shown), etc. A network device include any other components without departing from the invention. Examples of a network device comprise, but are not limited to: a network switch, a router, a multilayer switch, a fibre channel device, an InfiniBand® device, etc. A network device is not limited to the aforementioned specific examples.

The network (e.g., 120) supports (or otherwise enables) components such as the IHSs (e.g., 100A-100N), the bare metal orchestrator (140) and clients (e.g., 130) to communicate using one or more streams. Any particular communication may have one or more streams assigned to it, with a maximum number of streams being preconfigured as a consequence of the network's design. Each stream has a maximum throughput, which is the maximum amount of data that may be sent between two components during a period of time, given network conditions. The total number of streams that may be used is dependent on the capabilities of the network and components as well as the total throughput. Each stream utilizes a part of the total bandwidth; thus, when more streams are applied, each stream has a lower total throughput.

In one or more embodiments of the invention, assets such as data, files, folders, applications and/or notifications may be shared or transferred back and forth between the client (e.g., 130), the IHSs (e.g., 100A-100N), and the bare metal orchestrator (140). Any data related to an asset such as its files and/or folders may be stored in the client's storage (not shown). In one or more embodiments, the client (e.g., 130) may provide a user interface that may allow a user and/or administrator to receive notifications from the bare metal orchestrator (140)

The client (e.g., 130) may interact with the IHSs (e.g., 100A-100N). For example, the client (e.g., 130) may utilize the application services provided by the IHSs (e.g., 100A-100N). When the client (e.g., 130) interact with the IHSs (e.g., 100A-100N), data that is relevant to the client (e.g., 130) may be stored on one or more of the IHSs (e.g., 100A-100N). Additionally, the client (e.g., 130) may include functionality to use services provided by the IHSs (e.g., 100A-100N). For example, the client (e.g., 130) may host local applications that interact with the applications hosted by the IHSs (e.g., 100A-100N).

In one or more embodiments of the invention, the client (130) is implemented as a computing device (see e.g., FIG. 4). The computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions (stored on the persistent storage) that, when executed by the processor(s) of the computing device, cause the computing device to perform the functionality of the client (130) described throughout this application.

In one or more embodiments of the invention, one or more of the clients (e.g., 130) interacts with the bare metal orchestrator (140) to determine changes that are needed to either one or more IHSs (e.g., 100A-100N) or the network (120), such as the changes described in more detail below with regards to the method shown in FIGS. 2 and 3.

The bare metal orchestrator (140) is an infrastructure monitoring solution that configures and monitors the IHSs (e.g., 100A-100N). The bare metal orchestrator (140), as will be described in more detail with regards to the methods shown in FIGS. 2 and 3, produces and/or implements recommendations for configuring the IHSs (e.g., 100A-100N), specifically the RAC associated with each individual IHSs (e.g., 100A-100N) to provide failover and maintain a reliable connection between the RAC, IHS, and the connected network (e.g., 120).

In one or more embodiments of the invention, the bare metal orchestrator (140) may be located remotely. For example, the bare metal orchestra may be located in, but not limited to a manufacturer's datacenter, a cloud environment, or other location geographically separated from the IHSs (e.g., 100A-100N). In one or more other embodiments of the invention, it may be located in the same datacenter and/or location as one or more of IHSs (e.g., 100A-100N) and/or the one or more clients (e.g., 130).

In one or more embodiments of the invention, the bare metal orchestrator (140) is implemented as a computing device (see e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage that, when executed by the processor(s) of the computing device, cause the computing device to perform the functionality of the bare metal orchestrator (e.g., 140) described throughout this application.

In one or more embodiments of the invention, the bare metal orchestrator (e.g., 140) is implemented as a logical device. The logical device may utilize the computing resources of any number of computing devices and thereby provide the functionality of the bare metal orchestrator (e.g., 134) described throughout this application.

Figure 1B:
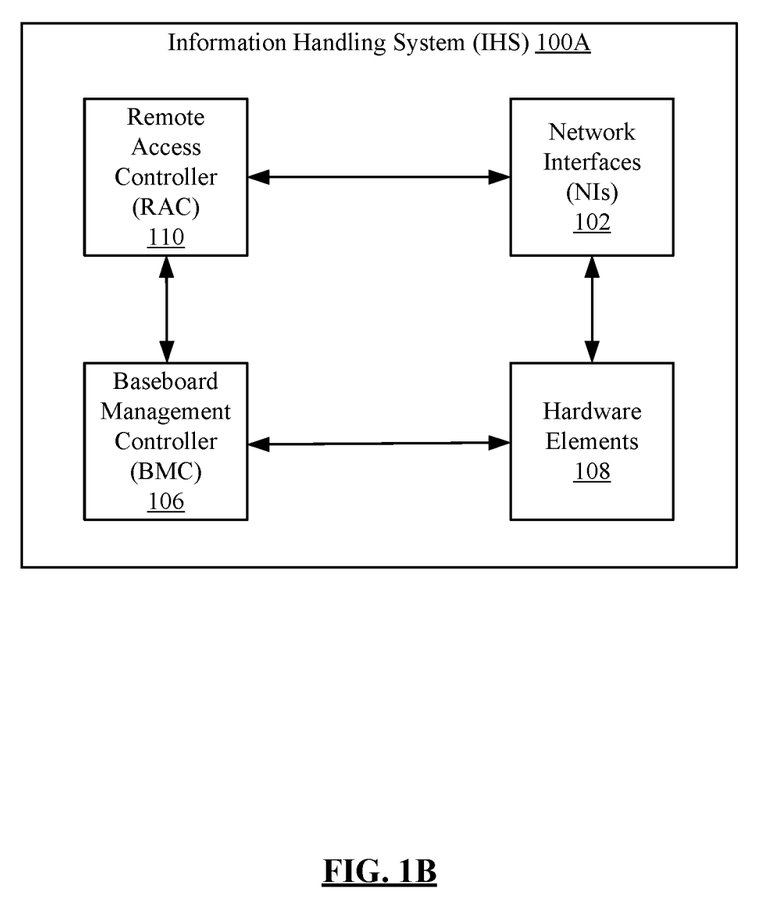
FIG. 1B shows a detailed diagram of an information handling system (IHS) in accordance with one or more embodiments of the invention.

Turning now to FIG. 1B, FIG. 1B shows a diagram of an information handling system (IHS) (100A) that, in accordance with one or more embodiments of the invention, includes various elements including a remote access controller (RAC) (110). The IHS (100A) is similar to the IHSs (e.g., 100A-100N) described above with regards to FIG. 1A. The IHS (e.g., 100A) hosts one or more applications and/or other processes. The IHS (100A) includes one or more hardware elements (108), at least one Network Interfaces (NI) (102), the RAC (110), and a baseboard management controller (BMC) (106). The IHS (100A) may include more or less components then shown in FIG. 1B without departing from the invention.

In one or more embodiments of the invention, the IHS (100A) may host production hosts and/or virtual machines (VMs) that host one or more applications, web services, and/or databases. The IHS (e.g., 100A) may host any number of production hosts and/or VMs that, in turn, host any number of applications.

In one or more embodiments of the invention, the IHS (100A) may be implemented as one or more computing devices (e.g., 400, FIG. 4). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the IHS (e.g., 100A) described throughout this application.

The IHS (100A), in one or more embodiments of the invention, includes one or more hardware elements (108). The hardware elements (108) include processors, memory, storage device and other elements. The hardware elements (108) may also refer to the software or firmware that is needed for the operation of the hardware elements (108) as well as the IHS (100A) in general. The hardware elements (108) may be physical devices or may be implemented as a logical device. The logical device may utilize the computing resources of any number of computing devices and thereby provide the functionality of the hardware elements (e.g., 108) described throughout this application. In one or more embodiments, the hardware elements interact with a baseboard management controller (BMC) (106). The BMC is a specialized microcontroller or other component that manages the interface between system management software, hardware elements, and other devices (such as the RAC (110) and network interfaces (102)).

In one or more embodiments of the invention, the BMC (106) and hardware elements (108) communicate and interact with the remote access controller (RAC) (110). The RAC is an out-of-band management platform that may be on a separate expansion card or integrated into the main board of the IHS. The RAC (110) interfaces with the BMC (106) and may be based on the intelligent platform management interface (IPMI), which allows for communication between a user/administrator and the BMC through a LAN or other network. In one or more embodiments, the RAC (e.g., 110) connects to the network through a network interface (NI) (e.g., 102). In one or more embodiment of the invention, the RAC (as will be described in more detail in FIG. 1C), includes one or more of its own network interfaces (NIs). Alternatively, it may share the NIs (102) that are a part of the general IHS (100A).

In one or more embodiments of the invention, the information handling system (100A) includes one or more network interfaces (NI) (e.g., 102). These may be stand-alone interfaces or may be part of one or more of the hardware elements (e.g., 108) and/or RAC (110), as will be described in more detail below with regards to FIG. 1C. In general, the IHS (100A) will include more than one NI (102) so that if one NI fails, the traffic from the network (e.g., 120, FIG. 1A) may be moved to a different NI. The addition of multiple NIs (e.g., 102) provides other advantages such as, but not limited to, allowing for faster interaction with the network (e.g., 120, FIG. 1A).

The NI (e.g., 102) is a physical controller and/or card that connects the various components of the IHS (100A) with the network (e.g., 120, FIG. 1A). The NI forms the hardware for communicating at the physical layer and data link layer. The NI allows for communications over a local area network (LAN), a wide area network (WAN), as well as potentially the Internet. While the NI may communicate wirelessly, in one or more embodiments of the invention, the NI (e.g., 102) is connected to the network (e.g., 120, FIG. 1A), which include one or more switches and other components, by one or more cables (not shown). The cables include conductors or fiber optics. Other combinations of NIs (e.g., 102), switches (not shown), routers (not shown), cables (not shown), and other network components may be used without departing from the invention.

When there is more than one NI (e.g., 102) present, depending on how the cables are configured, the NIs (e.g., 102) may work together or separately. When working together, they may be configured with teaming and have the ability to allow for failover. As will be discussed in more detail with regards to the methods of FIGS. 2 and 3, the NIs (e.g., 102) include multiple modes, and must be configured appropriately depending on the type and/or level of service desired.

Figure 1C:
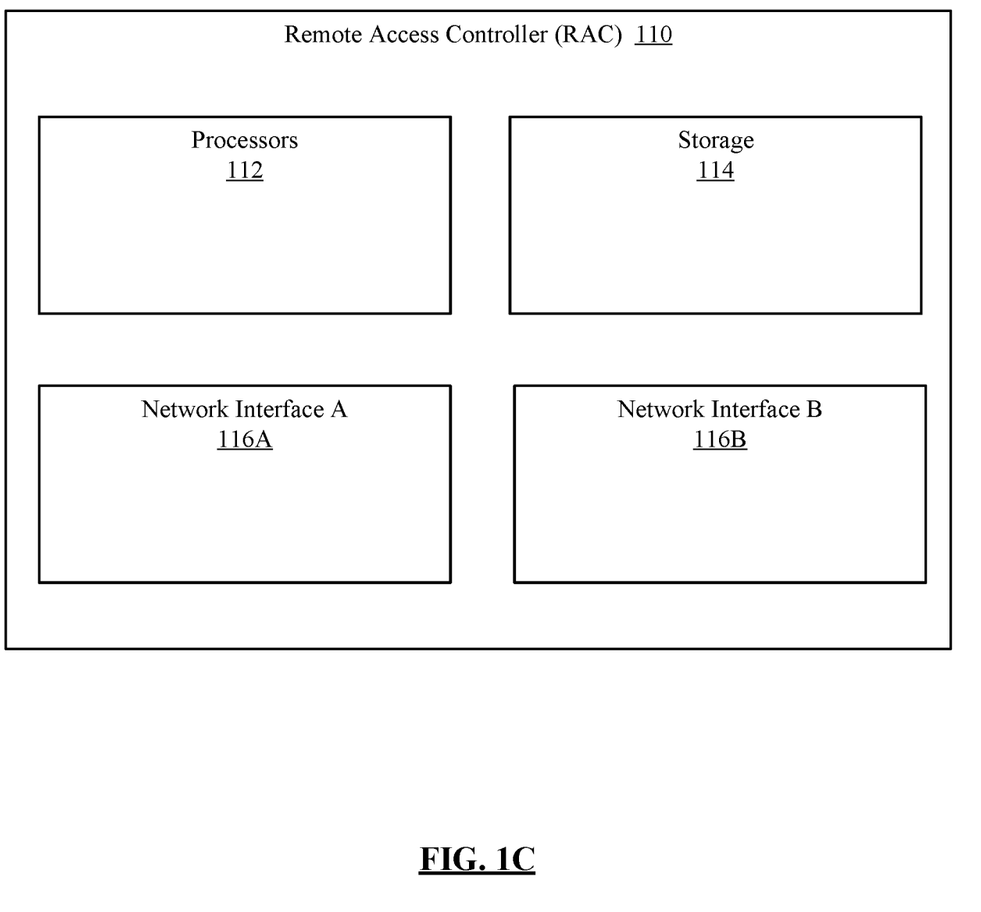
FIG. 1C shows a detailed diagram of a remote access controller (RAC) in accordance with one or more embodiments of the invention.

Turning to FIG. 1C, the remote access controller (RAC) (110), will be described in more detail. FIG. 1C shows the details of the remote access controller (RAC) (110) of FIG. 1B in more detail. The RAC is shown with processors (112), storage (114) and at least two NIs (116A and 116B). The RAC may include more or less parts than shown in FIG. 1C, without departing from the invention.

As described above with regards to FIG. 1B, the RAC (110) allows for remote access and management of the IHS (e.g., 100, FIG. 1B) either via the BMC (e.g., 106, FIG. 1B) or directly with one or more of the hardware elements (108, FIG. 1B). The RAC (110) allows for the remote management by utilizing one or more NI (e.g., 116A and 116B).

Frequently, RACs (110) either share the IHS's NIs (e.g., 102, FIG. 1B), or have a single dedicated NI (e.g., 116A). However, sharing the NIs with the rest of the IHS may potentially cause the RAC to be inoperative or to fail, due to the shared NI (e.g., 102, FIG. 1B) not being available for various reasons. Having its own dedicated NI helps to alleviate this. However, if the RAC is configured in a shared mode instead of a dedicated mode, the NI will not work during certain events such as an OS hang or prior to the OS booting. Further, even if the NI (e.g., 116A) is in a dedicated mode, if the single NI (e.g., 116A) suffers a failure or if the switch that the NI (e.g., 116A) is connected to fails, the RAC (110) will again be rendered unable to function and require user intervention. In order to overcome these issues, one or more embodiments of the invention may add at least a second NI (e.g., 116B) to the RAC (e.g., 110) along with the appropriate libraries, etc. This allows the RAC (110), when configured properly, to perform failover and potentially operate in a switch independent mode.

In one or more embodiments of the invention, the first NI (e.g., 116A) serves as a primary NI for the RAC (e.g., 110), while the second NI (e.g., 116B) serves as a backup or secondary NI. However, when the RAC (110) and/or network are functioning normally, other configurations may be used without departing from the invention. In failover, in accordance with one or more embodiments of the invention, the second NI (e.g., 116B) takes over (i.e., failover occurs)

and handles any network traffic directed towards the RAC (e.g., 110). In order to take advantage of the second NI (116B), when the second NI (116B) is added, the RAC (e.g., 110) must be reconfigured to take advantage of it. In one or more embodiments of the invention, the bare metal orchestrator (e.g., 140, FIG. 1A) determines the cabling requirements as well as configuration requirements for the RAC (110) and its first and second NIs (e.g., 116A-116B), as will be discussed next with regards to the method shown in FIGS. 2 and 3.

When the primary NI, RAC, and/or network is not functioning normally, as will be discussed in more detail with regards to the methods shown in FIGS. 2 and 3, the system first makes sure the primary NI is in a dedicated mode and if this does not resolve the issues, the RAC/NIs are reconfigured to a switch independent mode and failover is performed from the primary NI (e.g., 116A) to the second NI (e.g., 116B).

While the above steps may restore functioning to the system, there may still be a need for other actions to restore the system and/or restore normal functioning. In one or more embodiments of the invention, a user may be notified to change/re-configure cabling and/or repair the network (such as one or more bad switches), and/or replace a failed NI. Other recommendations and configurations may be performed without departing from the invention.

While FIGS. 1A-1C show a configuration of components, other configurations may be used without departing from the scope of embodiments described herein. For example, although FIG. 1B shows all components of an IHS as part of one device, any of the components may be grouped into sets of one or more components which may exist and execute as a part of any number of separate and operatively connected devices. Accordingly, embodiments disclosed herein should not be limited to the configuration of components shown in FIGS. 1A-1C.

Figure 2:
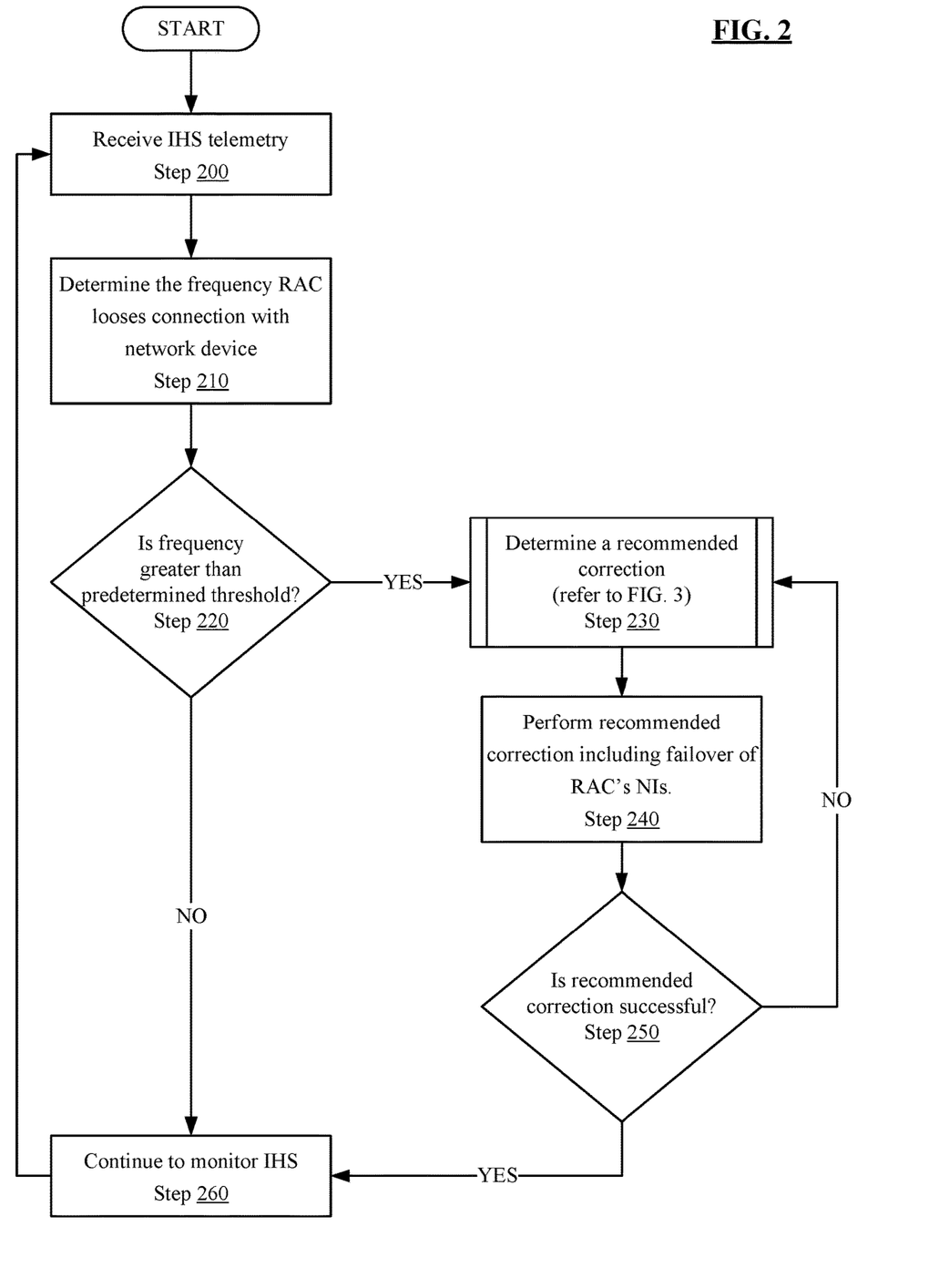
FIG. 2 shows a flowchart of a method for recommending changes to a system in accordance with one or more embodiments of the invention.

FIG. 2 shows a flowchart describing a method for recommending changes to an IHS having a RAC with two network interfaces. The method may be performed, for example, by the bare metal orchestrator (e.g., 140, FIG. 1A), one or more IHSs (e.g., 100A-100N, FIG. 1A) and/or the RAC (e.g., 110, FIG. 1B). Any other part of the system shown in FIGS. 1A-1C may perform the method, without departing from the invention. While FIG. 2 is illustrated as a series of steps, any of the steps may be omitted, performed in a different order, additional steps may be included, and/or any or all the steps may be performed in a parallel and/or partially overlapping manner without departing from the invention.

In step 200, the telemetry is received from the IHS. The telemetry may additionally include one or more system logs and other information that is useful for detecting a failure of a RAC or other network equipment. This may be performed continuously, periodically, and/or may be done when a user, administrator, or process of the IHS of a device suspects that the RAC may need reconfiguring and/or that the IHS is or soon will be in a failure state.

Once the telemetry is obtained in step 200, the method proceeds to step 210, where based on the telemetry, the frequency that the RAC loses connection with other network devices (such as, but not limited to, a network switch) or, if configured, the frequency that the failover occurs is determined. This frequency is then compared to a predetermined threshold in step 220. If the frequency is greater than a predetermined threshold, in step 220 the method proceeds to step 230, otherwise the method continues to step 260.

The predetermined threshold may be set by a user, administrator, or manufacturer. Alternatively, in one or more embodiments of the invention, the predetermined threshold is set by machine learning, which analyzes over time the causes of the IHS/RAC failure and determines the threshold in which steps 230-250 should be performed in order to avoid a failure. The threshold may be any amount of time that is deemed appropriate for the specific configuration of both the IHS and the connected network/switches.

In one or more embodiments of the invention, the method may use multiple linear regressions to determine the threshold. Multiple linear regression is a type of modelling that models the relationship between a scalar response and multiple explanatory variables. Multiple linear regression may be used to produce a predictive model to an observed set of data values with limited error. A basic model may be calculated using the following formula for making a model with multiple linear regression:

$$Y_i = B_0 + B_1 X_{i1} + B_2 X_{i2} + \ldots B_p X_{ip} + E_i.$$

Where Y is the ith observation of the dependent variable $X_{ij}$, $B_j$ are parameters to be estimated, and $E_i$ is the distributed normal error.

In order to forecast a threshold frequency, the various values for the RAC, network, and IHS are inputted into the multiple linear regression to determine the predicted value of an ideal threshold where it is statistically more likely that a failure in the IHS/RAC/Network may occur. Other machine learning methods for determining the threshold may be used without departing from the invention, as well as having a user/administrator/manufacture input values for the threshold without the use of machine learning.

If it is determined in step 220 that the frequency is greater than the predetermined threshold, the method then proceeds to step 230. In step 230, the bare metal orchestrator, or other appropriate component of the system, determines a recommended correction. In one or more embodiments of the invention, this is determined in the manner described in FIG. 3. Alternatively, or in addition to, a user or administrator may determine a recommendation. The recommendation may be determined by any method without departing from the invention.

Once the recommended correction is determined in step 230, the recommended correction is performed in step 240. The recommended correction, in one or more embodiments of the invention, may include performing a failover to a second or an additional NI associated with the RAC. Alternatively, or in addition, reconfiguring either the RAC or the connected network may be required. In one or more embodiments of the invention, where the recommendation can be performed automatically (such as switching the RAC to switch independent teaming), the bare metal orchestrator performs the correction. However, in one or more other embodiments and/or when the correction cannot be performed automatically, the recommend correction is performed by a user, administrator, or other authorize person(s).

Once the correction is performed in step 240, the method determines if the corrections were successful in step 250. If the corrections were unsuccessful, then steps of 230-250 are repeated until a successful correction/repair is made.

If, however, the corrections were successful, the method proceeds to step 260, and monitoring of the IHS continues. While the IHS is continued to be monitored, a user or automated system may choose to undo the correction when the threat is no longer applicable (for example, if a bad NI or switch is replaced, or the IHS/network is no longer functioning in such a way that the RAC would normally potentially loose its connection). This may be done because the previous modes of operation for the RAC, NIs, and/or network elements, may be more efficient for a particular application or configuration of the system in which the RAC and/or NI are deployed.

Figure 3:
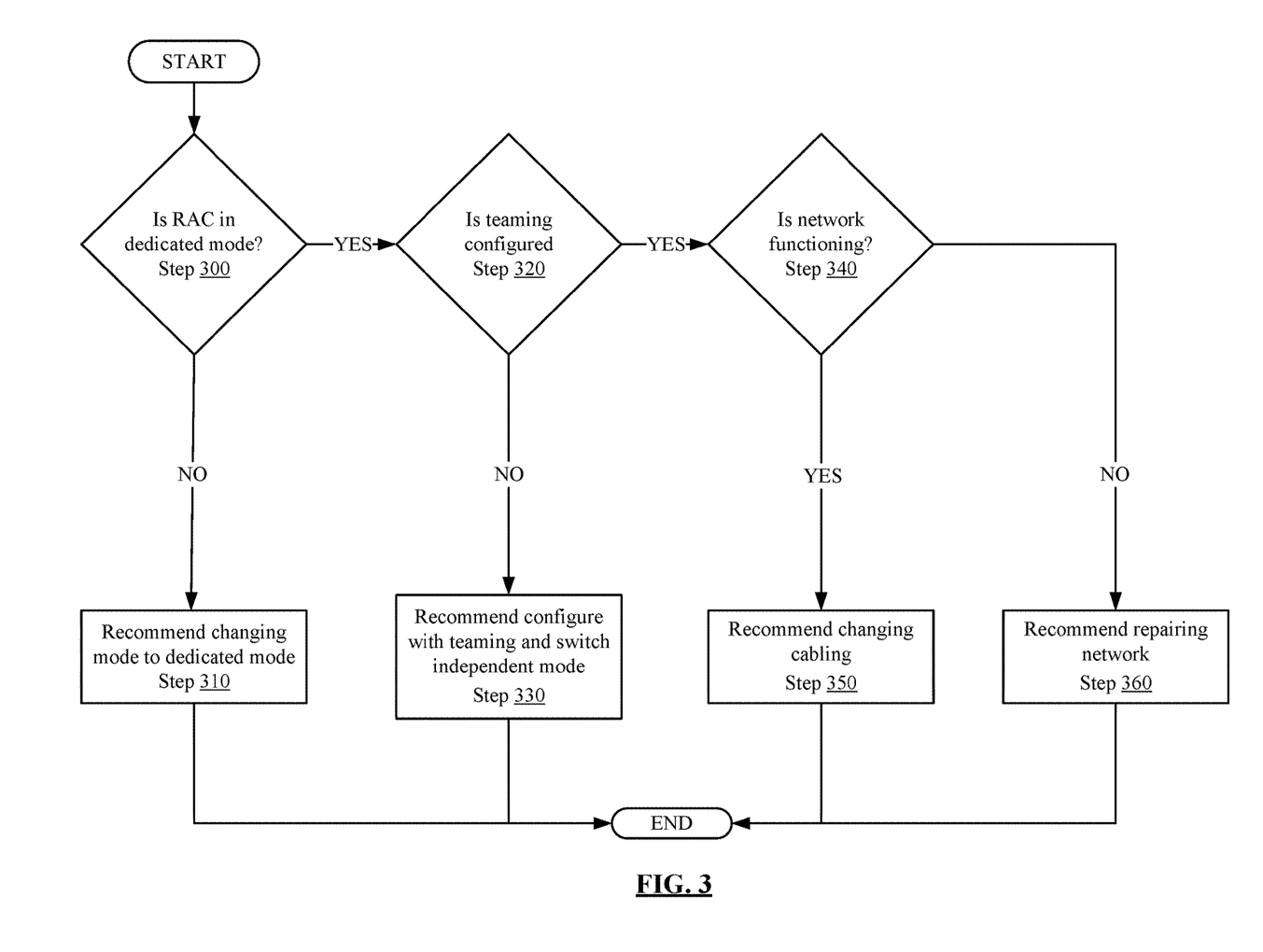
FIG. 3 shows a flowchart of a method for determining a recommended correction in accordance with one or more embodiments of the invention.

FIG. 3 shows a flowchart describing a method for determining a recommended correction for reconfiguring a RAC that includes at least two NIs. The method may be performed as step 230 of FIG. 2 or any other step of the method of FIG. 2. Alternatively, the method of FIG. 3 may be independent of the method shown in FIG. 2 and may be performed as part of other methods that require determining how to reconfigure an RAC and/or NI. The method may be performed, for example, by the bare metal orchestrator (e.g., 140, FIG. 1A), one or more IHSs (e.g., 100A-100N, FIG. 1A) and/or the RAC (e.g., 110, FIG. 1B). Any other part of the system shown in FIGS. 1A-1C may perform the method, without departing from the invention. While FIG. 3 is illustrated as a series of steps, any of the steps may be omitted, performed in a different order, additional steps may be included, and/or any or all the steps may be performed in a parallel and/or partially overlapping manner without departing from the invention.

In step 300, the method determines if the RAC and/or its underlying NIs are in a dedicated mode. If it is not, then the method proceeds to step 310, and the RAC and/or its NIs are switched to dedicated mode and the method ends. The dedicated mode allows the RAC to function even with an OS failure occurs and provides other advantages over the alternative shared mode and/or other modes. Once step 310 is completed, the method ends.

However, if, as described in step 250 of FIG. 2, the switching to dedicated mode as recommended in step 310 does not successfully correct the problem, the method of FIG. 3 restarts and step 300 now determines that the RAC is in a dedicated mode.

When step 300 determines that the RAC is in a dedicated mode, the method proceeds to step 320. The method determines if teaming is configured in step 320. If it is not, the method proceeds to step 330, where the method recommends configuring the RAC/NI to teaming, and to place the RAC/NI into switch independent mode. Failover is then performed, and the method ends.

However, if, as described in step 250 of FIG. 2, configuring teaming, placing the RAC/NI in switch independent mode, and performing failover does not successfully correct the problem, the method of FIG. 3 restarts and step 300 now determines that the RAC is in a dedicated mode, and that teaming is configured in step 320.

When step 320 determines that teaming is configured, the method proceeds to step 340. In step 340, a determination is made if the network and specifically the various elements making up the network and connecting the network to the RAC/NI are functioning correctly. If the bare metal orchestrator or other component determines the network is functioning in step 340, the method proceeds to step 350, and the recommendation is made for a user/administrator to either reconfigure or replace the cabling between the NIs of the RAC and the switch or other network component that they connect to.

Alternatively, if the bare metal orchestrator or other component determines that there is a problem with the network (for example, a faulty switch) the recommendation is made to repair/replace the faulty component of the network and/or contact the ISP or other network provider to perform repairs as appropriate.

The method ends following one of steps 310, 330, 350, and 360 and appropriate corrections such as failover and changing modes of the RAC/NI are performed.

Additionally, as discussed above, embodiments of the invention may be implemented using computing devices. FIG. 4 shows a diagram of a computing device in accordance with one or more embodiments of the invention. The computing device (400) may include one or more processor(s) (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the processor(s) (402) may be an integrated circuit for processing instructions. For example, the processor(s) (402) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s) (410). The input and output device(s) (408,410) may be locally or remotely connected to the processor(s) (402), non-persistent storage (404), and persistent storage (406). Many distinct types of computing devices exist, and the input and output device(s) may take other forms.

One or more embodiments of the invention may be implemented using instructions executed by one or more processors of the data management device. Further, such instructions may correspond to computer readable instructions that are stored on one or more non-transitory computer readable mediums.

The one or more embodiments of the invention described above may improve the IHS and/or RAC by providing failover for the RAC. The RAC is improved with the addition of a second NI along with the required teaming libraries which allow for failover to occur, increasing reliability. In order to ensure the functioning of the RAC, even when one of the NIs is failing, a bare metal orchestrator makes recommendations for configuring the necessary cabling as well as other settings. This includes having the administrators perform the correct cabling, as well as setting the RAC/NI teaming to the proper setting.

The problems discussed above should be understood as being examples of problems solved by embodiments of the invention disclosed herein, and the invention should not be limited to solving the same/similar problems. The disclosed invention is applicable to address a range of problems beyond those discussed herein.

While the invention has been described with respect to a limited number of embodiments, those skilled in the art, having the benefit of this disclosure, will appreciate that other embodiments may be devised which do not depart from the scope of the technology as disclosed herein. Accordingly, the scope of the invention should be limited only by the attached claims.

What is claimed is:

1. A method for recommending changes to a system that comprises at least one remote access controller, the method comprising:
retrieving telemetry from the system;
detecting, using the telemetry, the frequency that the at least one remote access controller loses its connection with a connected network, wherein the at least one remote access controller comprises out-of-band management via a first network interface dedicated to the at least one remote access controller;
determining, when the frequency is greater than a threshold, a configuration of the at least one remote access controller;
recommending, based on the configuration of the at least one remote access controller, one or more changes to the at least one remote access controller; and
implementing the one or more changes to the at least one remote access controller, wherein the one or more changes comprises switching the at least one remote access controller to implement teaming and switch independent mode to enable the at least one remote access controller to utilize both the first network interface and a second network interface that is shared with other components in the system to enable management of the at least one remote access controller via either the first network interface or the second network interface.

2. The method of claim 1, wherein determining the configuration of the at least one remote access controller comprises determining that the at least one remote access controller does not have teaming configured.

3. The method of claim 1, wherein the recommendation is made by a bare metal orchestrator.

4. The method of claim 3, wherein the bare metal orchestrator implements the one or more changes to the at least one remote access controller.

5. The method of claim 3, wherein the bare metal orchestrator notifies a user of the recommended one or more changes to the at least one remote access controller.

6. A non-transitory computer readable medium comprising computer readable program code, which when executed by a computer processor enables the computer processor to perform a method for recommending changes to a system that comprises at least one remote access controller, the method comprising:
retrieving telemetry from the system;
detecting, using the telemetry, the frequency that the at least one remote access controller loses its connection with a connected network, wherein the at least one remote access controller comprises out-of-band management via a first network interface dedicated to the remote access controller;
determining, when the frequency is greater than a threshold, a configuration of the at least one remote access controller;
recommending, based on the configuration of the at least one remote access controller, one or more changes to the at least one remote access controller; and
implementing the one or more changes to the at least one remote access controller, wherein the one or more changes comprises switching the at least one remote access controller to implement teaming and switch independent mode to enable the at least one remote access controller to utilize both the first network interface and a second network interface that is shared with other components in the system to enable management of the at least one remote access controller via either the first network interface or the second network interface.

7. The non-transitory computer readable medium of claim 6, wherein determining the configuration of the at least one remote access controller comprises determining that the at least one remote access controller does not have teaming configured.

8. A system comprising:
a remote access controller comprising a first network interface and a second network interface, wherein the first network interface is dedicated to the remote access controller and the second network interface is shared with other components in the system;
cables that connect the remote access controller to a network; and
a bare metal orchestrator which comprises:
at least one processor; and
at least one memory that includes instructions, which when executed by the processor, performs a method for recommending changes to the system, the method comprising:
retrieving telemetry from the system;
detecting, using the telemetry, the frequency that the remote access controller loses its connection with a connected network, wherein the remote access controller comprises out-of-band management via the first network interface;
determining, when the frequency is greater than a threshold, a configuration of the remote access controller;
recommending, based on the configuration of the remote access controller, one or more changes to the remote access controller; and
implementing the one or more changes to the remote access controller, wherein the one or more changes comprises switching the remote access controller to implement teaming and switch independent mode to enable the remote access controller to utilize both the first network interface and the second network interface to enable management of the remote access controller via either the first network interface or the second network interface.

9. The system of claim 8, wherein the bare metal orchestrator implements the one or more changes to the remote access controller.

10. The system of claim 8, wherein at least the bare metal orchestrator is part of a separate component of the system not associated with the remote access controller.

11. The system of claim 8, wherein the bare metal orchestrator notifies a user of the recommended one or more changes to the remote access controller.

12. The system of claim 8, wherein the bare metal orchestrator is at a geographical location that is separate from the remote access controller.

* * * * *